Aug. 28, 1962 — G. A. LYON — 3,051,276
WHEEL STRUCTURE
Filed April 15, 1959 — 2 Sheets-Sheet 1
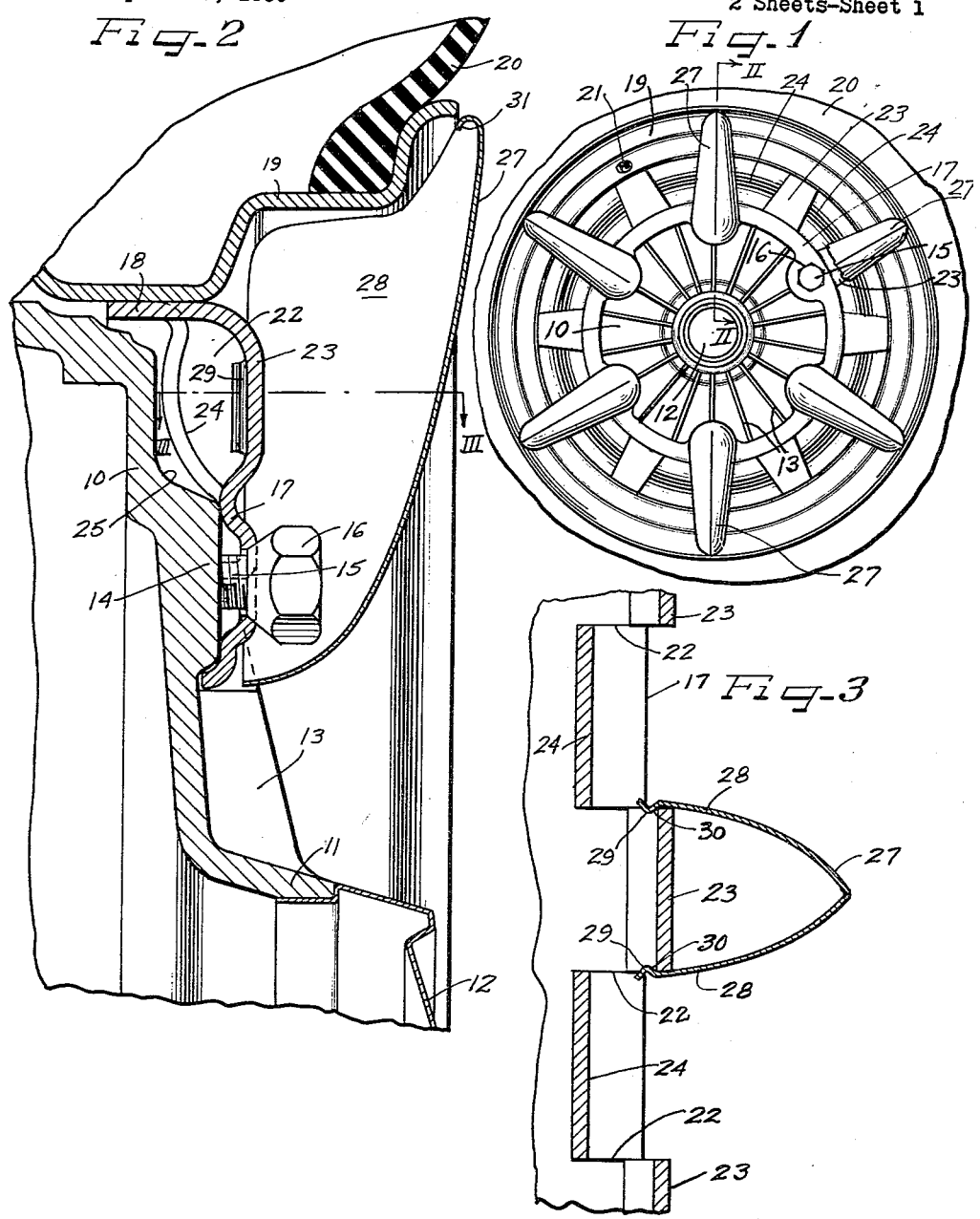
Inventor
George Albert Lyon

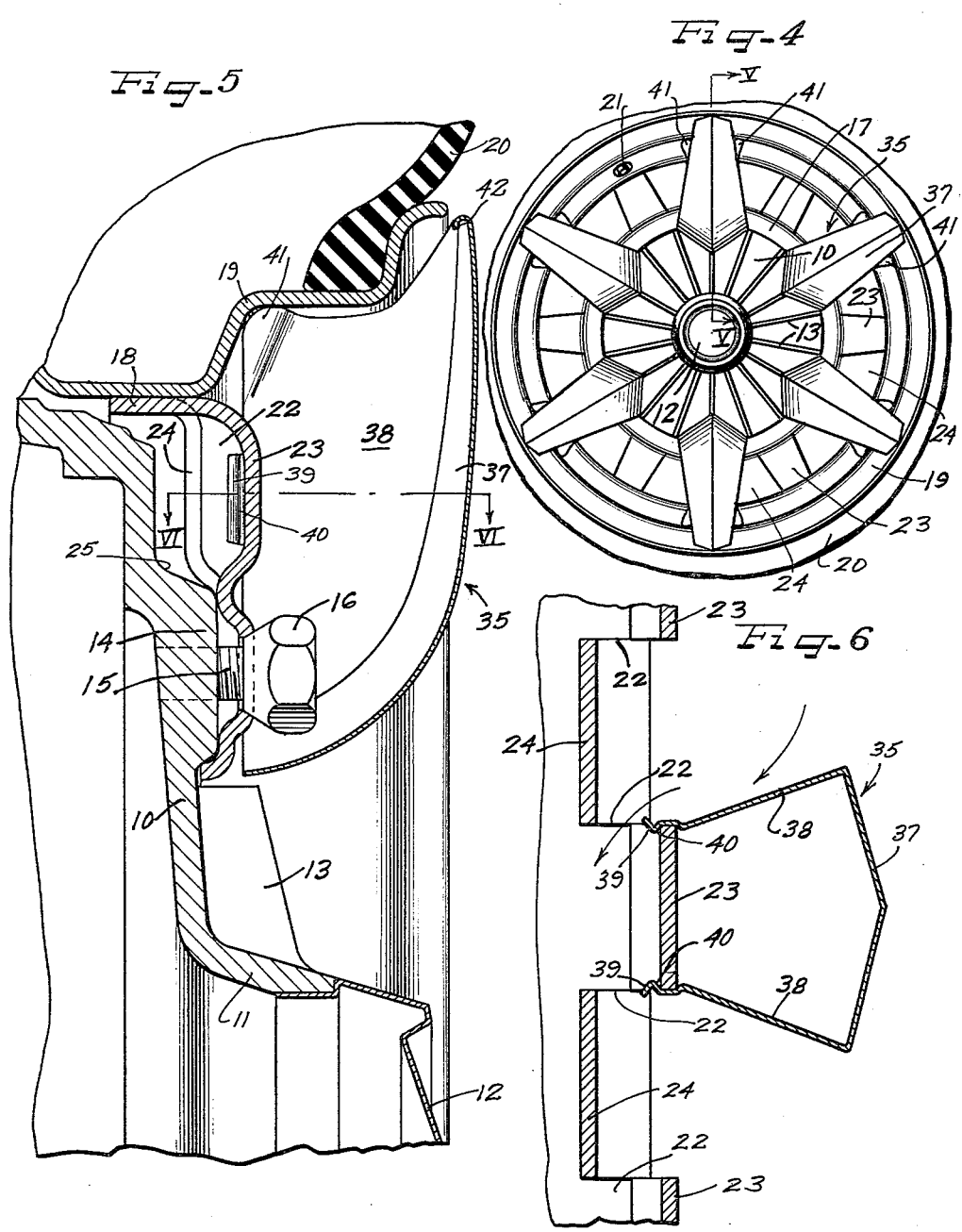

United States Patent Office 3,051,276
Patented Aug. 28, 1962

3,051,276
WHEEL STRUCTURE
George Albert Lyon, Detroit, Mich., assignor to Lyon Incorporated, Detroit, Mich., a corporation of Delaware
Filed Apr. 15, 1959, Ser. No. 806,612
9 Claims. (Cl. 188—264)

The present invention relates to improvements in wheel structures.

An important object of the present invention is to provide an improved wheel structure wherein the wheel is attached to a brake drum in a manner to expose a substantial central portion of the brake drum for heat dissipation at the outer side of the wheel.

Another object of the invention is to provide a novel wheel structure having means for substantially increasing air circulation in cooling relation over an associated supporting brake drum.

A further object of the invention is to provide in a wheel structure and brake drum assembly a novel narrow wheel body, tire rim supporting flange structure with axially outer side cooling fins on the associated brake drum and air circulation promoting structure on the wheel body flange.

Still another object of the invention is to provide improved ornamental spoke simulating shell members for press-on, pry-off engagement with portions of a wheel assembly for individually covering attachment bolts of the assembly.

It is also an object of the invention to provide a new and improved wheel structure affording large heat transfer exposure of a brake drum at the outer side of the wheel as well as air circulation cooling of the brake drum, together with selective covering of minor portions of the outer side of the wheel involving a minimum coverage of heat dissipating or air circulation promoting elements of the assembly.

A yet further object of the invention is to provide such a wheel structure in which the covering means implements and improves cooling air circulation relative to the brake drum.

Still another object of the invention is to provide novel means for increasing circulation of air through a wheel structure.

Other objects, features and advantages of the present invention will be readily apparent from the following detailed description of certain preferred embodiments thereof taken in conjunction with the accompanying drawings, in which:

FIGURE 1 is an outer side elevational view of a vehicle wheel embodying features of the invention and with one part broken away and revealing structure therebehind;

FIGURE 2 is an enlarged fragmentary radial detail sectional view taken substantially on the line II—II of FIGURE 1;

FIGURE 3 is a fragmentary sectional detail view taken substantially on the line III—III of FIGURE 2;

FIGURE 4 is an outer side elevational view of a wheel structure showing a modification of the individual spoke-like cover members;

FIGURE 5 is an enlarged fragmentary radial detail sectional view taken substantially on the line V—V of FIGURE 4; and FIGURE 6 is a fragmentary sectional detail view taken substantially on the line VI—VI of FIGURE 5.

Referring to FIGURES 1–3, a brake drum 10 of generally cup shape is constructed and arranged to be operatively assembled with and attached to suitable braking shoe or disk means with operating mechanism therefor and vehicle axle structure (all not shown) with a central aperture in the brake drum defined by a generally axially outwardly extending annular flange 11 through which an axle hub is projectable for access thereto. A small hub cap 12 seats upon the axially outer end portion of the brake drum flange 11 for protectively enclosing the axle hub.

Herein the brake drum 10 is of high heat transfer construction and may be made from a high heat transfer material such as aluminum. In addition, the axially outer face of the brake drum is constructed to improve heat transfer and for this purpose has a circumferentially spaced radially extending and axially outwardly projecting series of integral heat dissipating fins 13. At their radially inner ends the fins are integral with and emanate from the radially outer side of the central flange 11.

Intermediate its radially inner and outer peripheries and projecting axially outwardly about the radially outer ends of the heat transfer vanes 13 on the brake drum is a thickened reinforcing and wheel attachment land rib 14 having at circumferentially spaced intervals such as three to six threaded axially outwardly projecting wheel retaining studs 15 each of which is receptive of a wheel attaching nut 16 by which a generally L-shaped cross-section relatively narrow flange vehicle wheel body 17 is removably secured at its inner margin to the brake drum against the land rib 14. At its radially outer margin the wheel body has an axially inwardly extending attachment flange 18 by which it is suitably secured to the base flange of a multi-flange, drop center tire rim 19 adapted to support a pneumatic tire 20 which may be of the tubeless type inflated through a valve stem 21 carried by the tire rim.

In order to enhance heat dissipating and transfer value of the brake drum 10, the wheel body 17 is constructed for air circulation therethrough and in cooling relation to the brake drum therebehind. To this end, the wheel body is provided with a large number of openings 22 therethrough having large cross-sectional aggregate flow area, but without weakening the wheel body since no material is removed therefrom in forming the openings. Accordingly, the openings 22 are formed by slitting the material of the wheel body between the radially inner, bolt-on flange margin thereof and the attachment flange 18 along generally radial although preferably slightly circumferentially angled lines and deflecting alternate portions of the slit annular area relative to the remaining portions so as to provide generally radial spokes 23 providing a generally axially outwardly disposed series alternate to generally radial spokes 24 disposed axially inwardly spaced from the plane of the spokes 23. By their generally oppositely axially bowed relation and integral opposite end connection to the solid annular radially inner and outer parts of the wheel body 17, the spoke portions 23 and 24 afford a mutually reinforcing relation compensating for slitting of the wheel body. It will be observed in FIG. 2 that the brake drum 10 is recessed radially outwardly from the land rib 14 to provide a generally rabbet groove annular clearance 25 receptive of the axially inwardly disposed spoke portions 24. Through this arrangement, cooling air is enabled to circulate through the openings 22 about the portion of the brake drum 10 behind the spoke portions 23 and 24 and through the gap that exists between the radially outer periphery of the brake drum and the wheel body attachment flange 18 and the adjacent base portion of the tire rim 19.

As best seen in FIG. 1, certain of the spoke portions 23 are disposed in alignment with the attaching screw assemblies 15, 16. This feature is taken advantage of in providing attachment means for protective and ornamental individual spoke-simulating cover hoods 27 by which the attachment bolts are protectively concealed.

Each of the cover hoods 27 is preferably constructed from suitable sheet metal stamped or drawn into hollow shell form provided with side walls 28 of substantial length joined together at one end and spaced flaringly apart from a longitudinal crest, conforming at their free longitudinal margins generally to the sides of the respective wheel body spoke portions 23 over which the cover hoods are adapted to concealingly extend.

Press-on, pry-off retaining engagement of the cover hoods 27 with the respective associated wheel body spoke portions 23 is desirably effected by means of longitudinally elongated narrow retaining lug flange extensions 29 on the free edges of the side walls 28 and providing gripping shoulders 30 turned in under the respective side walls 28 and facing toward the inside of the chamber provided by the hood shell cover in each instance while the terminal portions of the gripping flange extensions provide oppositely, divergently flaring cam portions. The shoulders 30 normally project toward one another in a spaced relation which is less than the width of the spoke 23 to be engaged thereby. Through this arrangement, attachment of the cover hoods 27 is readily effected by aligning it over the spoke portion 23 with which it is to be associated and engaging the cam flange terminals of the retaining extension flanges 29 against the edges of the spoke element and then pressing axially inwardly to cause the indented shoulder portions of the retaining extension flanges 29 to yield and separate by resilient flexing of the shell side walls 28 until the lug indentations of the attachment flanges 29 clear past the edge of the spoke 23 and snap in behind the spoke edges so that a gripping resiliently tensioned engagement of the lug shoulders 30 is effected with the opposing edge portions of the spoke 23. The relationship is such that the edges of the side walls 28 radially inwardly from the retaining flange lugs 29, at least, engage against the inner marginal portion of the wheel body 17. In addition, by the inward convergence of the spoke covering hood side walls 28 away from the retaining lugs 29 a grip of the axially outer sides of the edges of the spoke 23 is effected by the side walls 28. Furthermore, the retaining flange lugs 29 are of a length to fit between the opposite generally axially turned end portions of the spoke 23. Thereby, the hood elements 27 are retained not only in axial, but radial disposition relative to the wheel and with the radially inner portions of the cover hoods 27 concealingly overlying and surrounding the attachment bolt structures 15, 16.

At their operatively radially outer ends, the cover hoods 27 are dimensioned to overlie subjacent areas of the tire rim 19 and the adjacent ends of the side walls 28 are generally complementary to the flange formation of the opposing portions of the tire rim, with the radially and axially outermost extremities of the side walls joined to an underturned finishing and reinforcing tip flange formation 31 adjacent to the extremity of the crest of the spoke-like cover hood to overlie the tire rim terminal flange in spaced relation and thus afford a gap through which air may circulate into the chamber of the cover hood for implementing cooling of the wheel covered by the hood.

Removal of the cover hoods 27 is readily effected by insertion of a pry-off tool behind the retaining flange lugs 29 to snap the same free from the respective spoke portions 23, thereby enabling clearance of the cover hoods from enclosing relation to the retaining bolt structures 15, 16 when access thereto is desired.

In the modification of FIGURES 4, 5 and 6, details of the brake drum and the wheel are substantially the same as in the form of FIGURES 1–3 and therefore identical reference numerals apply thereto, the principal difference residing in the formation of the cover hoods identified as 35. Accordingly, the same reference numerals have been applied to features of the brake drum and wheel and the description already given for such features will be understood to apply in this modification. One slight difference is evident in that the spoke portions 24 in this instance are not bowed inwardly as much as the spoke portions 24 in FIGURE 2, but this is a matter of choice.

Each of the cover hoods 35 is constructed and arranged not only to afford protective covering for the attachment bolt structures 15, 16, but also to provide air circulation vanes to assist and promote air circulation through the wheel openings 22. To this end, each of the spoke hoods 35 is constructed as a sheet metal shell having a longitudinal substantially rigid crest structure 37, with vane flange side walls 38 generally converging toward their longitudinal free edges which are provided with longitudinal retaining flange lug extensions 39 providing gripping shoulders 40 engageable with the respective wheel body spoke portions 23 in the same manner as described in connection with the retaining lug flange structures 29 of FIGURES 1–3.

In this instance, the axially inner and radially outer end portions of the side walls 38 are provided with flaring divergently extending air diverting lobes 41 which may as indicated in FIG. 5 thrust against the adjacent intermediate flange of the tire rim 19 to assist in retaining the hood cover member in place. This thrusting relation is coactive with respect to a tendency of the spoke hood shell members 25 to shift radially outwardly by riding of the spoke-edge-engaging terminal portions of the side walls 38 cammingly on the slightly radial outwardly converging edges of the respective spokes 23. If desired, of course, this camming and thrusting relationship may be utilized in connection with the spoke hood shell members 27 of FIGS. 1–3.

In addition, the lobes 41 coact with the tire rim 19 and the vane side walls 38 to move air from the slip stream, through which the wheel passes in turning in service, inwardly through the wheel openings 22 as indicated generally by the directional arrows in FIG. 6. At their radially and axially outer extremities, the side walls 38 are connected by a finishing tip underturned reinforcing flange 42 similarly as the corresponding flange 31 in FIG. 2.

Application and removal of the spoke simulating hood covers 35 is effected similarly as described in connection with the corresponding hood covers 27 in FIGS. 1–3.

It will be understood that modifications and variations may be effected without departing from the scope of the novel concepts of the present invention.

I claim as my invention:

1. In a wheel structure including a multi-flange tire rim supported by a wheel body having radially inner bolt-on flange structure engageable by a circumferential series of bolts to attach the same to a brake drum, spoke portions on the wheel body offset relative to adjacent portions of the wheel body and providing generally radially extending spoke portions in line with the attachment bolt means, individual cover hood members retainingly engaging said radially extending spoke portions and thrusting against the tire rim, said hood members having air vane side walls with angled air deflector portions thereof which are the portions of the hood members that thrust against the tire rim.

2. In a wheel structure including a multi-flange tire rim supported by a wheel body having radially inner bolt-on flange structure engageable by a circumferential series of bolts to attach the same to a brake drum, spoke portions of the wheel body offset relative to adjacent portions of the wheel body and providing generally radially extending spoke portions in line with the attachment bolt means, individual cover hood members having self-contained attachment means retainingly engaging said spoke portions and thrusting against the tire rim.

3. For application in concealing relation over attachment bolts of a wheel assembly, individual shell hood cover members of elongated form having crests with side walls resiliently flexibly movable relative to one another, said side walls having on their free edges cover retaining turned lug structure coactive with retaining shoulder structure on a wheel, said side walls diverging relative to one another from said free edges to face on their outer sides generally away from said crests on each of the shell hood cover members and thereby providing air motivating vanes.

4. In a wheel structure including a heat dissipating brake drum having a central finned portion with an annular axially outwardly projecting reinforcing rib radially outwardly about said fins, said rib having attachment bolt means at circumferentially spaced intervals, a wheel body having a flange provided with means engaging said rib and secured by said attachment bolt means, and detachable cover hoods attached to the wheel body in overlying concealing relation to the attachment bolt means, said wheel body having generally in line with said attachment bolt means circumferentially facing edges and said hood cover members having resiliently flexible side walls with retaining lug structure thereon engaging said edges in resilient tensioned engagement and with the side walls engaged against the wheel body.

5. In a wheel structure including a brake drum of high heat transfer material having a central portion with an axially outer face provided with radiating and axially outwardly projecting heat dissipating fins having their radially outer ends adjacent to an intermediate portion of the brake drum carrying a circumferentially spaced series of bolt-on screws, and a wheel assembly including a wheel body ring of generally L-shape cross-section having a flange supporting a drop center multi-flange tire rim and another flange extending radially inwardly for overlying the brake drum and with its inner periphery disposed adjacent to the radially outer ends of said fins, said radially extending body flange having the radially inner margin thereof secured directly to said brake drum by means of said attachment bolts, said radially extending flange having therethrough a circumferentially spaced series of openings for air circulation with respect to the portion of the brake drum therebehind, said brake drum having radially outwardly from the attachment bolts and behind said radially extending flange portion of the wheel body an inset axially outwardly opening annular recess, said openings being provided in part by gaps between axially inwardly inset portions of said radially extending wheel body flange and portions of said body flange axially outwardly disposed relative to and adjacent said inset portions, said inset portions extending into said inset annular recess so that said direct securing of the laterally extending body flange against the brake drum is enabled.

6. In a wheel structure including a brake drum of high heat transfer material having a central portion with an axially outer face provided with radiating and axially outwardly projecting heat dissipating fins having their radially outer ends adjacent to an intermediate portion of the brake drum carrying a circumferentially spaced series of bolt-on screws, a wheel assembly including a wheel body ring of generally L-shaped cross-section having a flange supporting a drop center multi-flange tire rim and another flange extending radially inwardly for overlying the brake drum and with its inner periphery disposed adjacent to the radially outer ends of said fins, said radially extending body flange having the radially inner margin thereof secured to said brake drum by means of said attachment bolts, said radially extending flange having therethrough a circumferentially spaced series of openings for air circulation with respect to the portion of the brake drum therebehind, said openings being provided by relatively offset portions of the wheel body flange, certain of said offset portions being generally radially aligned with said bolts, and individual cover hoods over said bolts and said certain offset portions and having means thereon retainingly engaging said certain offset portions.

7. In a wheel structure including a brake drum having a central portion with an axially outer face provided with radiating and axially outwardly projecting heat dissipating fins having their radially outer ends abrupt and facing radially outwardly adjacent to an intermediate portion of the brake drum carrying a circumferentially spaced series of bolt-on screws, a wheel assembly including a tire rim and a wheel body ring of generally L-shape cross-section having a flange supporting the tire rim and another flange extending radially inwardly for overlying the intermediate portion of the brake drum, said radially extending body ring flange having a radially inner margin thereof secured to the intermediate portion of the brake drum by said bolt-on screws and having a radially inner edge centeringly opposing said abrupt radially outer ends of said fins.

8. A wheel structure as defined in claim 5, wherein said annular recess is defined by a radially outwardly facing shoulder structure on the brake drum, and said inset portions closely opposing said shoulder.

9. In a wheel structure including a wheel body supporting a tire rim, said wheel body having an inner bolt-on flange marginal portion, bolts for attaching the bolt-on flange to a brake drum structure, individual shell hood cover members protectively concealing the bolts individually, said shell hood members being radially elongated and overlying subjacent areas of the wheel body and the tire rim, both the wheel body and the tire rim having retaining means thereon, and said shell hood members having retaining means thereon engageable in press-on, pry-off relation with the retaining means on the wheel body and the tire rim.

References Cited in the file of this patent

UNITED STATES PATENTS

| 1,510,048 | Evans | Sept. 30, 1924 |
| 1,580,544 | Spengler | Apr. 13, 1926 |
| 1,987,223 | Zerk | Jan. 8, 1935 |
| 1,989,211 | Norton | Jan. 29, 1935 |
| 2,019,145 | Le Jeune | Oct. 29, 1935 |
| 2,022,153 | Rogers | Nov. 26, 1935 |
| 2,109,722 | Fawick | Mar. 1, 1938 |
| 2,164,883 | Moore | July 4, 1939 |
| 2,196,990 | Hunt | Apr. 16, 1940 |
| 2,754,940 | Lyon | July 17, 1956 |
| 2,881,875 | Felts | Apr. 14, 1959 |
| 2,952,491 | Lyon | Sept. 13, 1960 |

FOREIGN PATENTS

| 919,394 | Germany | Oct. 21, 1954 |
| 532,367 | Italy | Aug. 22, 1955 |